(12) United States Patent
Shousterman

(10) Patent No.: US 8,265,648 B2
(45) Date of Patent: Sep. 11, 2012

(54) RESOURCE ALLOCATION IN A RADIO COMMUNICATION SYSTEM

(75) Inventor: Leonid Shousterman, Alfei-Menashe (IL)

(73) Assignee: Alvarion Ltd., Tel-Aviv (IL)

( * ) Notice: Subject to any disclaimer, the term of this patent is extended or adjusted under 35 U.S.C. 154(b) by 532 days.

(21) Appl. No.: 12/495,896

(22) Filed: Jul. 1, 2009

(65) Prior Publication Data

US 2011/0002275 A1 Jan. 6, 2011

(51) Int. Cl.
*H04W 72/00* (2009.01)

(52) U.S. Cl. ............... 455/453; 455/450; 455/456.5; 455/464; 455/561

(58) Field of Classification Search .............. 455/453, 455/450, 456.5, 464, 561
See application file for complete search history.

(56) References Cited

U.S. PATENT DOCUMENTS 5,627,831 A * 5/1997 Azmak .................. 370/332
2004/0203734 A1* 10/2004 Ishii ....................... 455/426.1

OTHER PUBLICATIONS

WiMAX Forum "Mobile WiMAX—Part I: A Technical Overview and Performance Evaluation", WiMAX Forum, 53 P., Aug. 2006.

* cited by examiner

*Primary Examiner* — Nghi H Ly

(57) ABSTRACT

A method of using resource blocks in a communication system with a plurality of Base Stations (BSs), including assigning resource blocks to a first BS, the first BS communicating to a second BS a message comprising information about at least one resource block assigned to the first BS and not planned to be used by the first BS, and the second BS receiving the message. Optionally, the second BS using the at least one resource block. Related apparatus and methods are also described.

5 Claims, 10 Drawing Sheets

RESOURCE ALLOCATION IN A RADIO COMMUNICATION SYSTEM

FIELD AND BACKGROUND OF THE INVENTION

The present invention, in some embodiments thereof, relates to a communication system and, more particularly, but not exclusively, to a cellular communication system, and even more particularly, but not exclusively, to resource allocation in a cellular communication system.

A non-limiting example of resource allocation is time-division multiplexing, which separates time slots for forward and return signals. Non-limiting examples of Time Division Duplexing systems are: W-CDMA (for indoor use); UMTS-TDD's TD-CDMA air interface; the TD-SCDMA system; DECT; IEEE 802.16 WiMAX TDD; half-duplex packet mode networks based on carrier sense multiple access, for example 2-wire or hubbed Ethernet; Wireless local area networks; and Bluetooth, can all be considered as Time Division Duplex systems.

For example, in systems using Orthogonal Frequency Division Multiple Access (OFDMA), such as Time Division Duplexing (TDD) and Frequency Division Duplexing (FDD) systems, a two dimensional frame is defined in order to assign frequencies (e.g. subcarriers) and determine time division. The two dimensional frame has time as one dimension and frequency as another dimension. Within each frame frequencies and a time slot are assigned for use, for example for a Base Station (BS) to transmit at a downlink (DL) time slot, to a Mobile Station (MS), and to receive at an uplink (UL) time slot, from a MS.

Background art includes a publication named "Mobile WiMAX—Part I: A Technical Overview and Performance Evaluation", published August 2006 by the WiMAX Forum, and available on the World Wide Web at: www.wimaxforum.org/news/downloads/Mobile_WiMAX_Part1_Overview_and_Performance.pdf

SUMMARY OF THE INVENTION

The present invention, in some embodiments thereof, allocates resource use in a cellular communication system by having base stations communicate availability of free resources.

According to an aspect of some embodiments of the present invention there is provided a method of using resource blocks in a communication system with a plurality of Base Stations (BSs), including assigning resource blocks to a first BS, the first BS communicating to a second BS a message including information about at least one resource block assigned to the first BS and not planned to be used by the first BS, and the second BS receiving the message.

According to some embodiments of the invention, further including the second BS using the at least one resource block.

According to some embodiments of the invention, the communication system includes a Time Division Duplex (TDD) communication system. According to some embodiments of the invention, the communication system includes a Frequency Division Duplex (FDD) communication system.

According to some embodiments of the invention, further including a second BS communicating a message including information about at least one resource block assigned to the second BS and not planned to be used by the second BS, and at least one other BS than the second BS receiving the message. According to some embodiments of the invention, further including the at least one other BS than the second BS using the at least one resource block assigned to the second BS.

According to some embodiments of the invention, communicating messages occurs between the BSs in a peer-to-peer fashion. According to some embodiments of the invention, communicating messages occurs between the BSs in a master-slave fashion, and further including a master BS instructing a slave BS which data to transmit in the at least one of the resource blocks.

According to some embodiments of the invention, the resource blocks are divided into a plurality of groups, and the resource blocks are used in an order based, at least in part, according to the groups. According to some embodiments of the invention, at least two different BSs each have at least two different groups for the resource blocks.

According to some embodiments of the invention, the communication system is a WiMAX system. According to some embodiments of the invention, the communication system is an LTE system.

According to an aspect of some embodiments of the present invention there is provided a method of using resource blocks in a communication system with a plurality of Base Stations (BSs), including assigning resource blocks to a first BS and to a second BS, having at least the first BS transmit first data about its planned use of resource blocks, having at least the second BS receive the transmitted first data, having at least the second BS transmit second data to the first BS, and having the first BS transmit the second data to a Mobile Station (MS) using at least one of the resource blocks assigned to the first BS.

According to an aspect of some embodiments of the present invention there is provided a method of using resource blocks in a communication system with a plurality of Base Stations (BSs), including at least two neighboring BSs scheduling use of resource blocks, to be used in a specific time period, each one of the at least two neighboring BSs at first planning to use resource blocks defined as primary resources for each one of the at least two neighboring BSs, the at least two BSs communicating a first message including information about at least one resource block each one of the at least two BSs is not planning to use, to their adjacent neighbors, the at least two BSs receiving the message, the at least two BSs scheduling use of the resource blocks referenced in the first message, and the at least two BSs executing their schedule.

According to some embodiments of the invention, further including, after the at least two BSs scheduling use of the resource blocks referenced in the first message the at least two BSs communicating a second message including information about at least one additional resource block each one of the at least two BSs is not planning to use, the at least two BSs receiving the second message, and the at least two BSs scheduling use of the additional resource blocks, before the at least two BSs execute their schedule.

According to an aspect of some embodiments of the present invention there is provided a method of using resource blocks in a communication system with a plurality of Base Stations (BSs), including at least three neighboring BSs, of which at least two BSs are not adjacent neighbors of each other, scheduling use of resource blocks, to be used in an communication frame, each one of the three neighboring BSs at first scheduling use of resource blocks defined as primary resources for each one of the three neighboring BSs, the at least three BSs sending a first message including information about resource blocks not scheduled for use to other BSs of the at least three BSs, the at least three BSs receiving the first message, the at least three BSs scheduling use of the resource blocks referenced in the first message, and the at least three BSs executing their schedule.

According to some embodiments of the invention, further including, after the at least three BSs scheduling use of the resource blocks referenced in the first message the at least three BSs sending a second message including information about at least one additional resource block each one of the at least three BSs is not planning to use, the at least three BSs receiving the second message, and the at least three BSs scheduling use of the additional resource blocks, before the at least three BSs execute their schedule.

According to some embodiments of the invention, further including additional cycles of at least one of the at least three BSs sending a message including information about at least one more additional resource block the at least one BS is not planning to use to the others of the at least three BSs, the others of the at least three BSs receiving the message, and at least one of the at least three BSs scheduling use of the at least one more additional resource block, before the at least three BSs execute their schedule.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
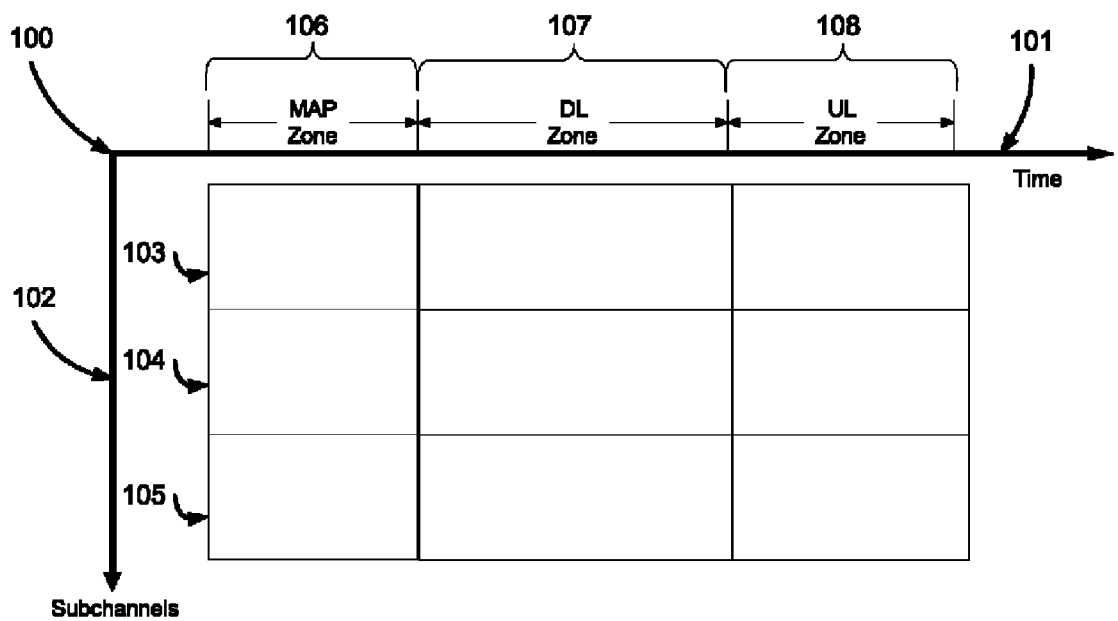
FIG. 1 is a simplified illustration of a prior art Orthogonal Frequency Division Multiple Access (OFDMA) frame.

The present invention, in some embodiments thereof, relates to a communication system and, more particularly, but not exclusively, to a cellular communication system, and even more particularly, but not exclusively, to resource allocation in a cellular communication system.

The present invention, in some embodiments thereof, improves resource use in a cellular communication system by having base stations (BSs) communicate availability of free resources. The BSs use the available free resources for improving communications with mobile stations (MSs). By improving resource use, the present invention, in some embodiments thereof, enables, by way of a non-limiting example, communicating between a BS and a MS at a higher data rate. The higher data rate enables improving communication, whether by sending more data in a given time, and/or sending redundant data which particularly enables optionally sending more error correction overhead data.

A "resource block" is hereby defined as a resource which, when used by more than one communication station, may cause interference.

An example of a resource block in the field of OFDMA communications is optionally a time slot in one sub-channel.

The term "allocate" in all its grammatical forms is used throughout the present specification and claims interchangeably with the term "assign" and its corresponding grammatical forms.

Allocating and/or assigning resource blocks are typically done as part of a Radio Resource Management (RRM) plan. By way of a non-limiting example, the RRM in a communication network is typically produced by a Radio Network Controller (RNC).

In a prior art cellular network many resource blocks go unused, by design. For example, in reuse ⅓ schemes, many resource blocks may be unused by a BS but cannot be reallocated to other BSs operating at the same frequency channel.

In an exemplary embodiment of the invention, some or all of the unused resource blocks are reallocated to other BSs. The unused resource blocks are used, by way of non-limiting examples, to improve total communication volume, and/or for a diversity scheme to improve the reliability of a message signal by utilizing two or more communication channels with different characteristics. Optionally the diversity scheme improves the signal to noise ratio (SNR) of the message. Optionally the diversity scheme enables receiving the message at a greater distance from a BS. Optionally the unused resource blocks are used for sending some packets of a packet communication twice, thereby increasing a likelihood of correct reception without errors.

Reallocating the unused resource blocks is performed rapidly, optionally in less than one time slot, thereby enabling reallocation of the unused resource blocks close enough to real-time to use all or most of the unused resource blocks by the next time slot after their being available is discovered. An example embodiment of the allocation method is described below with reference to FIGS. 8-11.

In some cases, the additional resource blocks may be prone to a lower SNR, due to interference.

In some embodiments of the invention, the same data may be transmitted from two or more BSs to the same MS, thereby improving chances of data being uncorrupted even if the data is sent via the additional resource blocks.

The lower SNR may not be suitable for some uses, but may be suitable for other uses, such as, by way of a non-limiting example, data networks with error correction or with repeat transmission such as Ethernet.

In some embodiments of the present invention, there exists a master-slave relationship between base stations, so that a master BS determines which BS uses the free resource blocks.

In some example embodiments of the invention, the master-slave relationship between base stations is optionally set upon BS installation, optionally according to known characteristics of the BS, such as expected MS density and/or expected message traffic for the BS.

In some example embodiments of the invention, the master-slave relationship between base stations is optionally set and/or changed dynamically, optionally according to a history of relative MS density and/or relative message traffic for the BSs.

In some example embodiments of the invention, the master-slave relationship between base stations is optionally decided by a central arbitrator, optionally according to dynamic characteristics of the BS, such as expected MS density and/or expected message traffic for the BS.

In some example embodiments of the invention, the master-slave relationship between base stations is optionally set and/or changed dynamically and as a real-time change to changing conditions.

In some embodiments of the invention, the master-slave relationship is optionally defined between base stations by a mobile station in communication with base stations which are candidates for the master-slave relationship.

In some embodiments of the invention, the master-slave relationship is defined between base stations with reference to a specific data channel and/or one or more specific sub-channels.

In some embodiments of the invention, the master-slave relationship is defined between base stations such that a first base station is master over a second base station with reference to specific data and/or a specific sub-channel and/or a group of resource blocks, and the second base station is master over the first base station with reference to another specific data and/or another specific sub-channel and/or another group of resource blocks.

In some embodiments of the invention, the master-slave relationship is defined between base stations with reference to a chunk of data, and/or an ad-hoc, temporary data channel, such as, by way of a non-limiting example, to transmit a movie; to transmit, broadcast, and/or multicast other chunks of data; and for point-to-point transmission of a chunk of data.

For purposes of better understanding some embodiments of the present invention, as illustrated in FIGS. 5-11 of the drawings, reference is now made to FIG. 1, which is a simplified illustration of a prior art OFDMA frame 100.

The frame 100 has a horizontal time axis 101, and a vertical frequency axis 102. The frequency axis 102 depicts several sub-channels 103 104 105. The time axis 101 depicts one time slot, subdivided into a MAP zone 106, a DL zone 107, and a UL zone 108. The sub-channels are at different frequencies. Each frame has a MAP zone, during which a BS transmits metadata; a DL zone, during which DL optionally occurs; and a UL zone, during which UL optionally occurs. The metadata optionally includes data about resource allocation, such as sub-channel allocation, frequency allocation, DL time slot allocation, UL time slot allocation.

Figure 2:
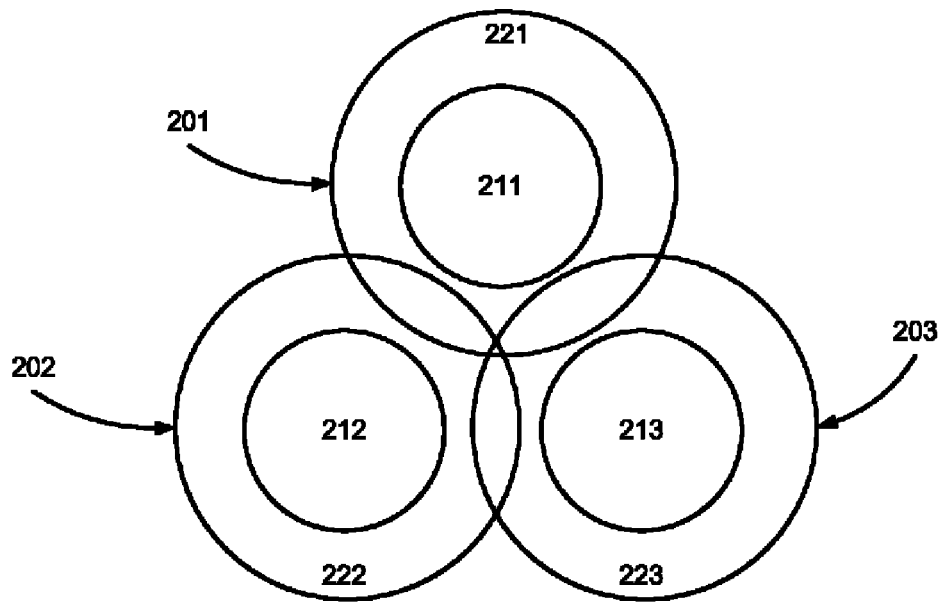
FIG. 2 is a simplified illustration of cells in a prior art cellular communication system.

Reference is now made to FIG. 2, which is a simplified illustration of cells in a prior art cellular communication system. FIG. 2 depicts, by way of a non-limiting example, 3 cells 201 202 203. Signal strength is good at and near cell centers 211 212 213. Signals at cell edges 221 222 223 are weaker, and also typically suffer interference from signals in neighboring cells, because at cell edges MSs typically pick up signals from BSs of more than one cell.

Frequency allocation is sometimes maintained at frequency reuse one. Frequency reuse one is a reuse scheme which is achieved when all sectors within a cell and all cells within a network operate on a same frequency channel. However, frequency reuse one (reuse 1) in a cellular network may cause users at a cell edge to get degraded signals due to interference from adjacent cells using the same frequencies.

Mobile WiMAX (Worldwide Interoperability for Microwave Access), by way of example, addresses the issue of interference from adjacent cells by using a Partially Used Sub-Carrier (PUSC) scheme. MSs at a cell edge are only allowed to operate on a fraction of all available sub-channels. The sub-channel fraction is allocated in such a way that adjacent cells' edges operate on different sets of sub-channels. This is called fractional frequency use.

Taken from a base station's point of view, some sub-channels of a base station are at some times left unused, since they serve a neighboring base station under a PUSC scheme.

In PUSC reuse 3 (also known as reuse ⅓), only one third of the sub-carriers are used. Assuming neighboring BSs also employ PUSC reuse ⅓, but use other thirds of the sub-carriers allocated for reuse ⅓, inter-cell interference can be reduced significantly.

The term "PUSC" in all its grammatical forms is used throughout the present specification and claims interchangeably with the term "reuse" and its corresponding grammatical forms and with the term "PUSC reuse" and its corresponding grammatical forms. The term "PUSC" as used herein refers to its use with reference to the mobile WiMAX example, as mentioned above.

The term "sub-channel" in all its grammatical forms is used throughout the present specification and claims interchangeably with the term "frequency" and its corresponding grammatical forms.

Figure 3:
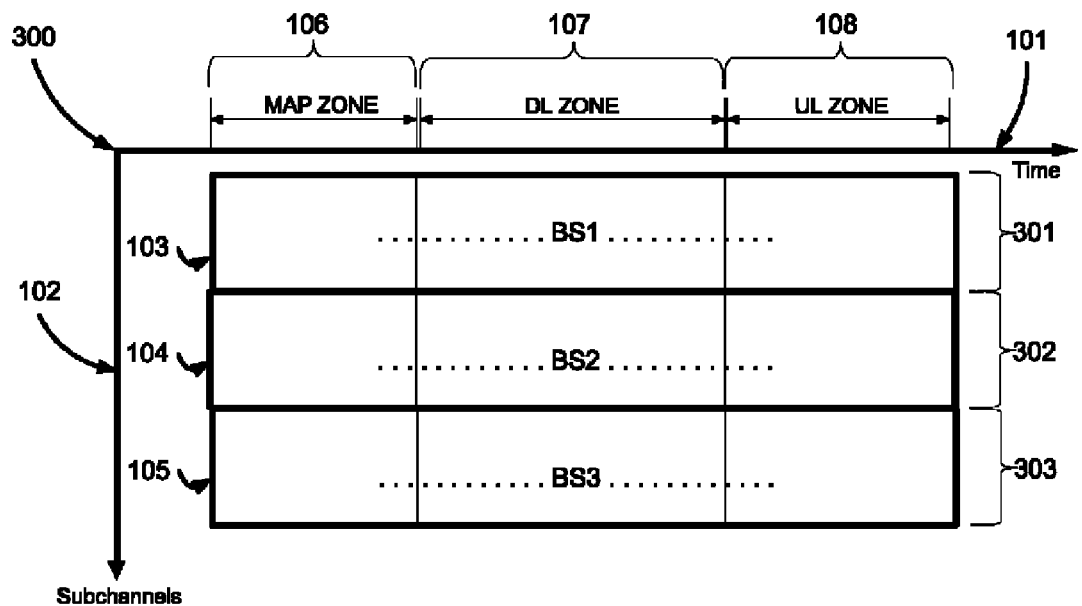
FIG. 3 is a simplified illustration of the operation of a reuse ⅓ frame.

Reference is now made to FIG. 3, which is a simplified illustration of the operation of a reuse ⅓ frame 300.

The reuse ⅓ frame 300 includes the horizontal time axis 101 and the vertical frequency axis 102 of FIG. 1. The frequency axis 102 depicts the several sub-channels 103 104 105 of FIG. 1. The time axis 101 depicts the time frame, subdivided into a MAP zone 106, a DL zone 107, and a UL zone 108 as in FIG. 1.

The sub-channels 103 104 105 are divided among BSs, for use in communication with MSs. By way of a non-limiting example, the reuse ⅓ frame 300 allocates a first sub-channel 103 to a first base station BS1 (not shown), for use in communication with a first mobile station MS1 (not shown). The reuse ⅓ frame 300 also allocates a second sub-channel 104 to a second base station BS2 (not shown), for use in communication with a second mobile station MS2 (not shown), and a third sub-channel 105 to a third base station BS2 (not shown), for use in communication with a third mobile station MS2 (not shown). In this fashion the communication between three exemplary BSs and three corresponding MSs can occur at the same time on different sub-channels, without producing interference, according to the reuse ⅓ scheme.

It is noted that other schemes may be used, such as ½, ¼, and so on. The reuse schemes typically depend on base station physical layout and communication conditions, which together influence what portion of sub-channels need to be allocated for overcoming interference.

It is noted that other sub-channels (not shown) may concurrently be used by other MSs. More than one sub-channel is typically used by a BS concurrently. More than one MS typically communicates concurrently with each BS. FIG. 3 depicts a much-simplified example relative to a typical reuse ⅓ frame 300.

It is noted that other communication schemes may be used, in which the vertical axis may be divided into sub-channels according to other methods, appropriate to other communication methods. By way of a non-limiting example, the vertical axis may be divided into sub-channels according to CDMA code space.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 4:
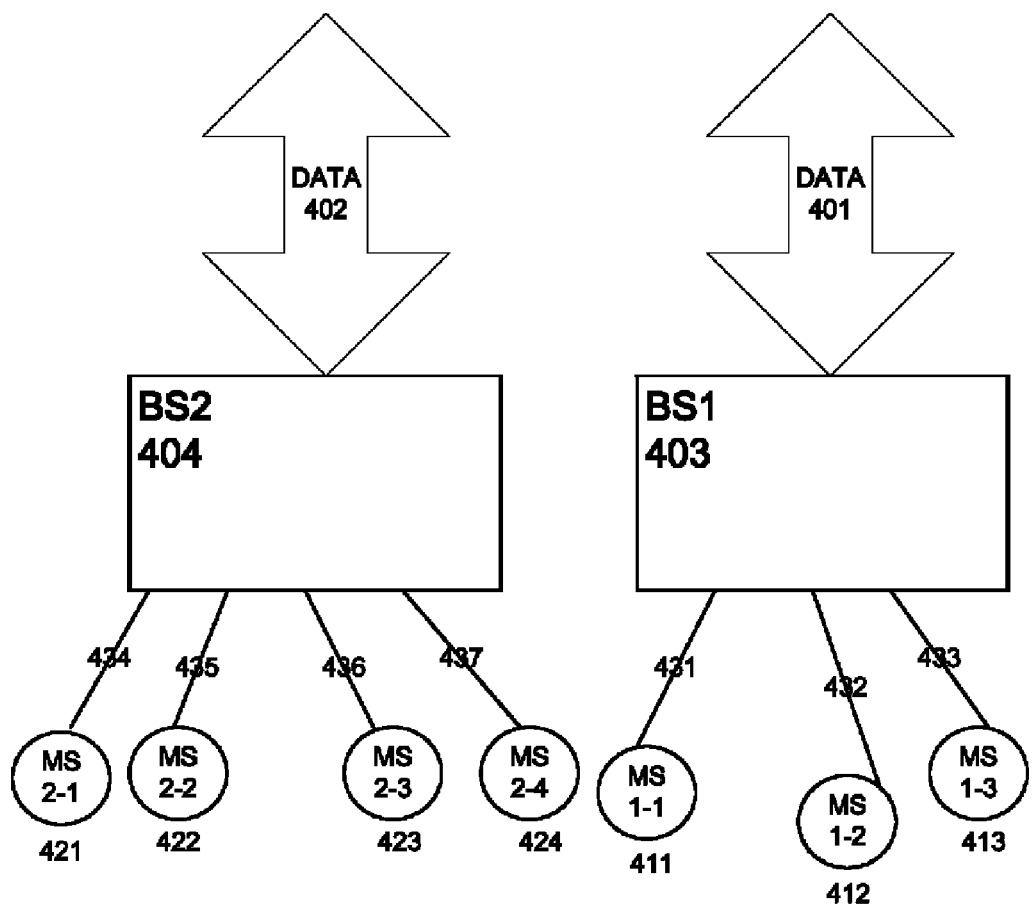
FIG. 4 is a simplified illustration of two exemplary Base Stations (BSs), communicating with several exemplary Mobile Stations (MSs)

Reference is now made to FIG. 4, which is a simplified illustration of two exemplary base stations (BSs), a first BS, BS1 403, and a second BS, BS2 404, communicating with several exemplary mobile stations (MSs): MS1-1 411, MS1-2 412, MS 1-3 413, MS2-1 421, MS2-2 422, MS2-3 423, and MS2-4 424.

Communication data 401 402 reaches the BS1 403 and the BS2 404 via some communication medium (not shown). The BS1 403 and the BS2 404 communicate with the MS1-1 411, the MS1-2 412, the MS1-3 413, the MS2-1 421, the MS2-2 422, the MS2-3 423, and the MS2-4 424 using radio channel communication. Separate and distinct, whole resource blocks are allocated to each line of communication: a line of communication 431 from the BS1 403 to the MS 1-1 411, a line of communication 432 from the BS1 403 to the MS1-2 412, and so on up to a line of communication 437 from the BS2 404 to the MS2-4 424.

It is noted that resource blocks allocated to the BSs may be free at certain times, for a variety of reasons.

By way of a non-limiting example, a resource block may be allocated to a BS according to a partial reuse scheme, and the BS may not be currently using the resource block.

By way of another non-limiting example, a MS may have stopped communicating, leaving the resource blocks allocated for its communication free until a new MS requires the resource blocks.

It is noted that it is possible that some MSs consume and produce more traffic than others. Some BSs communicate with more MSs than other BSs, at any one time. Therefore it is likely that one BS may be loaded much more than another BS.

It is noted that when using micro cells and pico cells the variance in loading between BSs is typically larger than with BSs in larger cells.

It is noted that just as there may be unused resource blocks in TDD communication systems, there may be unused resource blocks in Frequency Division Duplex (FDD) communication systems.

In FDD typically a pair of frequencies is used: one frequency is used for uplink and another frequency is used for downlink. The pair of frequencies, per a time slot, may optionally be considered a single resource block, or the pair of frequencies, per a time slot, may optionally be considered two resource blocks.

It is noted that embodiments of the invention apply to FDD as well as to the TDD examples brought herein.

It is noted that embodiments of the invention apply to various OFDM schemes. One such scheme, by way of a non-limiting example, is named "Long Term Evolution" (LTE), and another such scheme is WiMAX.

Having identified instances of unused resource blocks, some applications of reuse of the unused resource blocks will be described.

Figure 5A:
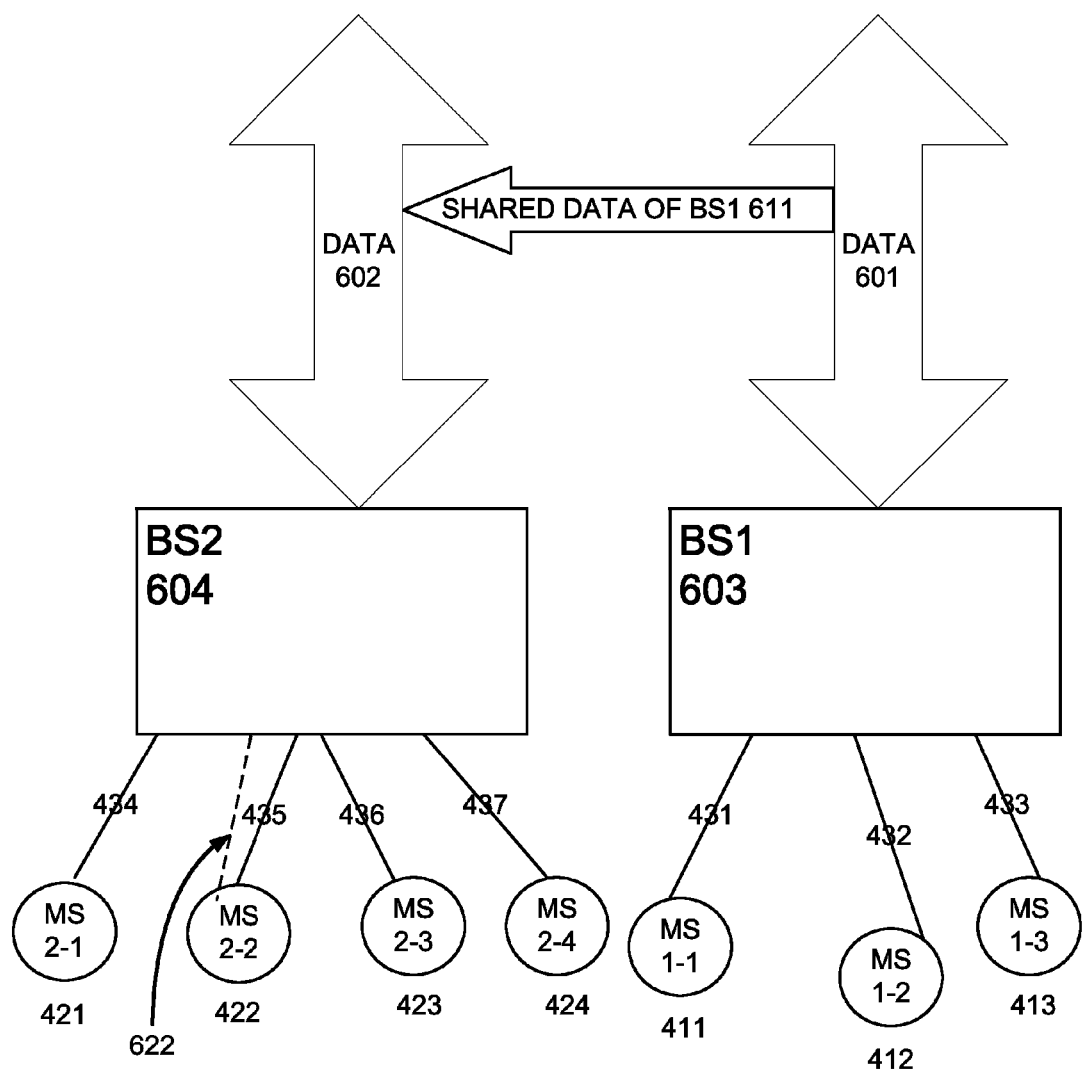
FIG. 5A is a simplified illustration of two BSs constructed and operating according to an embodiment of the present invention.

Reference is now made to FIG. 5A, which is a simplified illustration of two BSs 603 604 constructed and operating according to an embodiment of the present invention.

The two base stations (BSs) 603 604 are depicted communicating with several exemplary mobile stations MS1-1 411, MS1-2 412, MS1-3 413, MS2-1 421, MS2-2 422, MS2-3 423, and MS2-4 424.

Data 601 602, such as network data, reaches the BSs 603 604 via some communication medium (not shown).

In addition, shared data such as shared control data 611 from the BS1 603 is optionally reaching the BS2 604. The shared control data 611 includes information or data about free resource blocks which were assigned to the BS1 603, but are not planned to be used by the BS1.

The BSs 603 604 communicate with the MSs 411 412 413 421 422 423 424 through radio channels, as described above with reference to FIG. 4.

In addition, concurrently, based on an embodiment of the present invention, additional data is being sent by the BS2 604 to some MSs, such as, by way of a non-limiting example, MS2-2 422, by using a resource block, currently unused by the BS1.

The BS2 604 is using the resource block in order to send additional data to the MS2-2 422.

It is noted that the BS2 604 is using one or more resource blocks, which the BS2 604 was not originally supposed to be using, but the BS2 604 is using these resource blocks when they are known to be unused by the BS1, by virtue of communication between the BSs about the unused time slots.

In some embodiment of the invention the shared control data 611 includes information or data about free resource blocks which were assigned to the BS1 603, but are not likely to be used by the BS1. These resource blocks are not certainly free, but likely to be free.

The above comment about certainly free resource blocks and likely to be free resource blocks applies to further descriptions of resource reuse included herein with reference to FIGS. 5B, 6, 8, 9, 10, and 11.

Figure 5B:
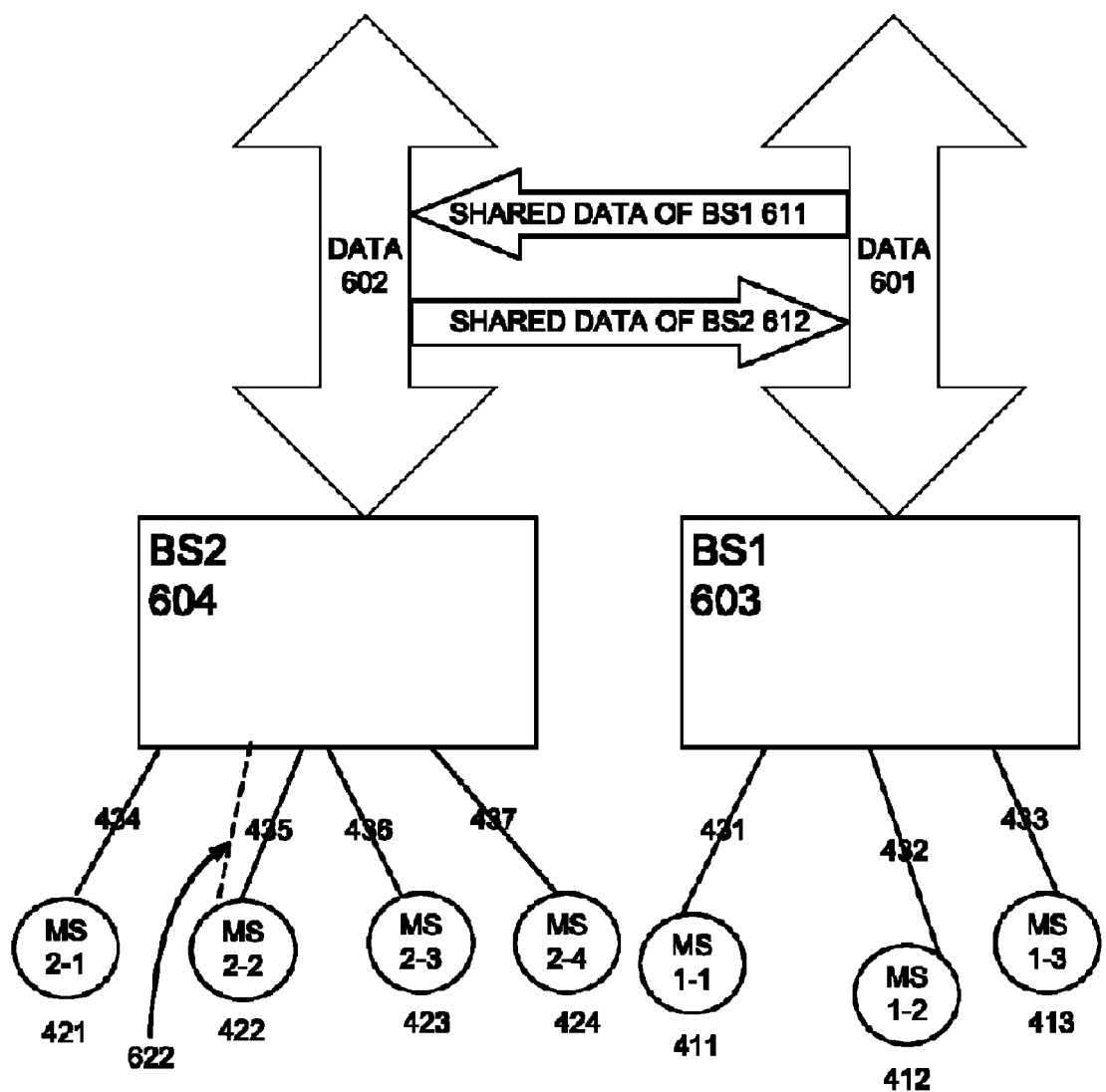
FIG. 5B is a simplified illustration of two BSs constructed and operating according to an alternative example embodiment of the present invention, communicating with several MSs.

Reference is now made to FIG. 5B, which is a simplified illustration of two BSs 603 604 constructed and operating according to an alternative example embodiment of the present invention, communicating with several MSs.

The two base stations (BSs) 603 604 are depicted communicating with several exemplary mobile stations MS1-1 411, MS1-2 412, MS1-3 413, MS2-1 421, MS2-2 422, MS2-3 423, and MS2-4 424.

Communication data, such as data 601 602, reaches the BSs 603 604 via some communication medium (not shown).

In addition, shared data such as the shared control data 611 from the BS1 603 is optionally reaching the BS2 604. The shared control data 611 includes information about free resource blocks which are assigned to the BS1 603 and are not expected to be used.

Shared control data 612 from the BS2 604 is optionally reaching the BS1 603. The shared control data 612 includes information about resource blocks which were assigned to the BS2 604 but unused by the BS2 604.

The BSs 603 604 communicate with the MSs 411 412 413 421 422 423 424 using the radio channel, as described above with reference to FIG. 4.

In addition, concurrently, based on an embodiment of the present invention, additional data is being sent to some MSs, such as, by way of a non-limiting example, MS2-2 422, by using a resource block which was assigned to the BS1 603 but unused or not expected to be used by the BS1 603.

The BS2 604 is using the resource block in order to send additional data to the MS2-2 422.

It is noted that the BS2 604 is using one or more resource blocks which the BS1 603 was not, for example initially supposed to be using, when they are known to be unused by BS1 603, by virtue of communication about the free resource blocks.

In an embodiment of the present invention, the shared control data 611 612 is communicated between the base stations 603 604 in a peer-to-peer fashion. The base stations 603 604 communicate with each other and with other base stations, as depicted below with reference to FIGS. 8 and 10, with no central control.

In an alternative embodiment of the present invention, the shared control data 611 612 is communicated between the base stations 603 604 under control of one or more controllers instructing the base stations 603 604 how to allocate unused resource blocks, and/or the shared control data 611 612 may be communicated through the controller.

In some embodiments of the invention, the communication is optionally performed via a communication connection having a latency duration of less than a time slot.

In another alternative embodiment of the present invention, the base stations 603 604 have a master-slave relationship. The master base station optionally instructs the slave base station, via the shared control data 611 612, what unused resource blocks to use.

Having a peer-to-peer relationship enables each of the base stations 603 604 to discover resource blocks unused by the peer and allocate them for its own use, as will be described in more detail below, with reference to FIGS. 8-11.

Figure 6:
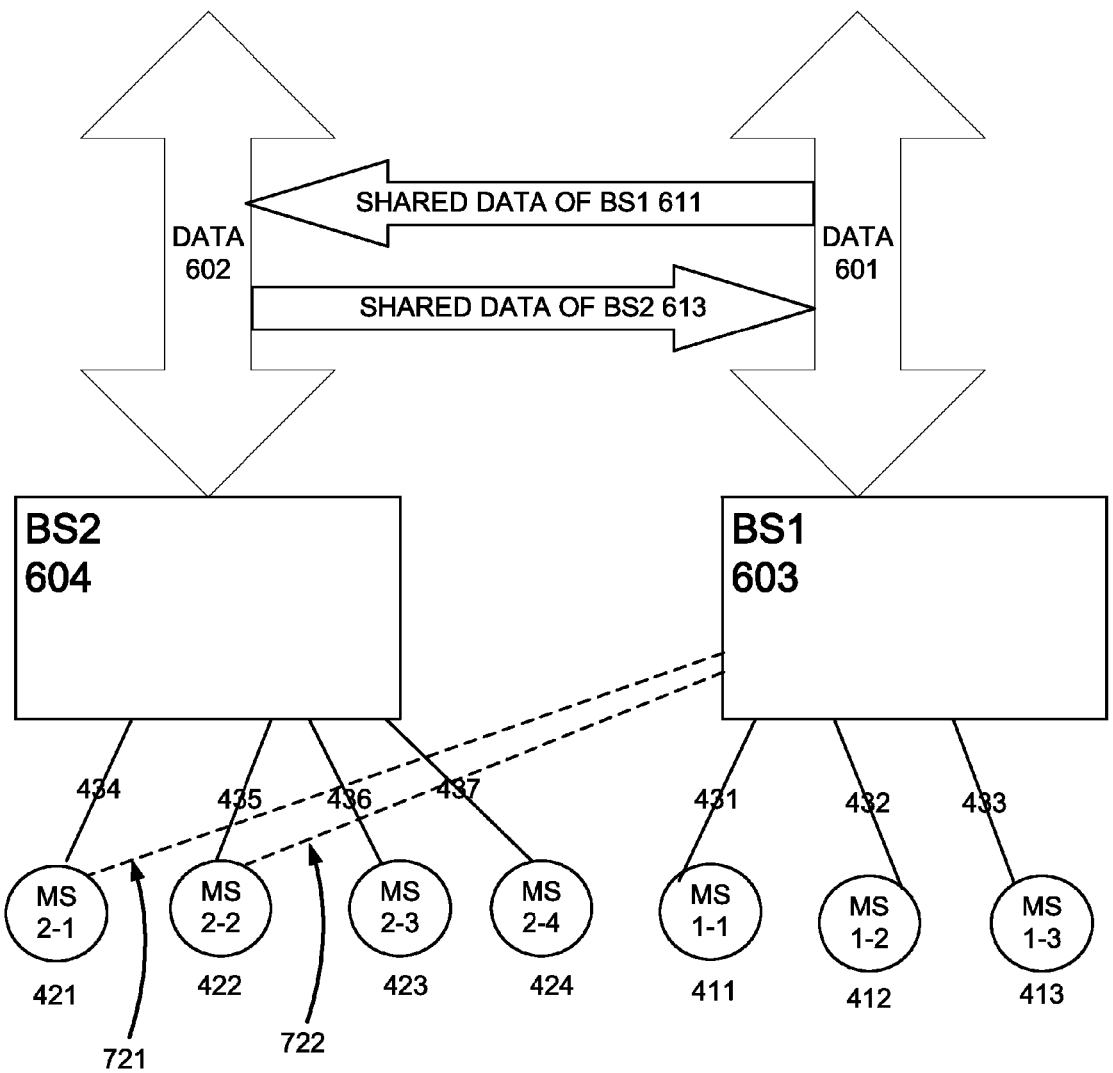
FIG. 6 is a simplified illustration of the BSs and MSs of FIG. 5B, in an alternative application of the example embodiment of FIG. 5B.

Reference is now made to FIG. 6, which is a simplified illustration of the BSs and MSs of FIG. 5B, in an alternative application of the example embodiment of FIG. 5B.

The alternative application of the present invention uses unused sub-channels and time slots of a two different base stations to communicate to mobile stations within communication distance of the two different base stations.

The two base stations BS1 603 and BS2 604 are depicted communicating with several exemplary mobile stations MS1-1 411, MS1-2 412, MS1-3 413, MS2-1 421, MS2-2 422, MS2-3 423, and MS2-4 424. The communication is performed using resource blocks, and may be one-way from a BS to an MS, one way from an MS to a BS, or two way communications between a BS and an MS.

Communication data 601 602 reaches the BS1 603 and the BS2 604 via some communication medium (not shown), such as, by way of a non-limiting example, a wired network, a wireless network, or a combination of both.

In addition, shared control data 611 from the BS1 603 reaches the BS2 604. The shared control data 611 includes data about free resource blocks which are allocated to the BS1 603 and are not expected to be used.

Shared control data 613 from the BS2 604 reaches the BS1 603. The shared control data 613 includes data about free resource blocks which are allocated to the BS1 603 and are not expected to be used, and/or data which the BS2 604 needs to have the BS1 603 send to an MS.

The BSs 603 604 communicate with the MSs 411 412 413 421 422 423 424 using radio communications, as described above with reference to FIG. 4.

In addition, concurrently, based on an embodiment of the present invention, the BS1 603 is optionally sending data to some MSs by using free, currently unused resource blocks. The data being sent may be additional data, thereby adding to the volume of data being sent to some MSs, and/or the data may be redundant data, thereby enabling error correction to be performed on the data.

At any specific time slot, the BS1 603 may be using a resource block which would have been allocated to the BS2 604 according to prior art, in order to send additional data to the MS2-1 421 (see communication 721) according to the embodiment of the present invention. The BS1 603 is also using resource blocks which would have been allocated to the BS2 604 according to prior art, in order to send additional data: to the MS2-2 422 (see communication 722).

It is noted that the BS1 603 is using sub-channels which the BS1 605 was not supposed to be using, but the BS1 603 is using them in a time slot when the sub-channels are known to be free, by virtue of communication about the free time slots.

It is additionally noted that the BS1 603 is communicating to MSs which are in a cell belonging to the BS2 604. The communication to another cell may cause more errors, because of a larger distance, or because of possible interference. The higher error rate may not be suitable for some uses, but may be suitable for other uses, such as, by way of a non-limiting example, data networks with error correction or with repeat transmission such as, by way of a non-limiting example, WiMAX and Ethernet.

In an embodiment of the present invention, the shared control data 611 613 is communicated between the base stations 603 604 in a peer-to-peer fashion. The base stations 603 604 communicate with each other and with other base stations, as depicted below with reference to FIGS. 8 and 10, with no central control.

In an alternative embodiment of the present invention, the shared control data 611 613 is communicated between the base stations 603 604 under control of one or more controllers instructing the base stations 603 604 how to allocate unused resource blocks, and/or the shared control data 611 613 may be communicated through the controller.

In another alternative embodiment of the present invention, the base stations 603 604 have a master-slave relationship. The master base station, by way of a non-limiting example BS2 604, optionally instructs the slave base station, BS1 603, via the shared control data 613, what unused sub-channels and time slots to use. In yet another alternative embodiment of the present invention, the master base station BS2 604 optionally uses the shared control data 613 to communicate data via the slave base station BS1 603 and the additional lines of communication 721 and 722.

Having a master slave relationship enables a first base station to use a second base station for sending data which requires more bandwidth than available to the first base station were the base stations not using the invention.

There are several ways by which a BS can know what resource blocks are free for use.

One way by which a BS can find out what resource blocks are free for use is by communicating with other BSs.

In some embodiments of the invention a BS optionally provides neighboring BSs with data about resource blocks the BS has been allocated according to a reuse scheme, and is not planning to use, thereby letting the neighboring BSs know which resource blocks are free. The above is a push technology.

In some embodiments of the invention a BS optionally requests neighboring BSs for data about resource blocks the neighboring BSs have been allocated or assigned according to a reuse scheme, and are not using. The above is a pull technology.

In some embodiments of the invention a BS finds out what resource blocks are free for use by having a central coordination unit (not shown), which communicates with base stations, gather information about unused resource blocks, and provide the information about unused resource blocks to the base stations.

In some embodiments of the invention, the central coordination unit may be included in one of the base stations, and/or several coordination units may be included in some of the base stations.

One way for the information to be provided to the base stations is by push technology, that is, by letting each base station know what resource blocks are free to be used by that base station. Another way for the information to be provided to the base stations is by pull technology, that is, by having a base station which requires additional resource blocks request the central coordination unit for information about free resource blocks.

A central coordination unit may be overloaded, and/or may be distant, and/or may provide a single failure point for using free resource blocks, so in some cases a distributed method may be preferred.

Communication between neighboring BSs, and/or between BSs and a central coordination unit, occurs in a time which shall be termed herein latency.

When the latency is substantially shorter than a time slot, BSs optionally plan use of unused reuse resource blocks, and can start providing communication based on the plan when the next time slot starts. A "reuse resource block" is hereby defined as a unit of one time slot in one sub-channel, selected from sub-channels which are allocated for use in a reuse scheme, such as, by way of a non-limiting example, the sub-channels allocated for use in a reuse ⅓ scheme. A typical time slot lasts tens of microseconds in some cellular communication systems.

Latency of communication between neighboring BS, and/or between BSs and a central coordination unit, depends on how they communicate. Latency can easily be 1 millisecond, when using broadband links between BSs. Good candidate for communication between the BSs are high speed microwave links, and fiber optic links.

When the latency is substantially equal to a time slot, using an unused reuse resource block may still be done, especially when there are many unused sub-channels. The disadvantage caused by interference may be lower than the advantage provided by having additional resource blocks communicate data. This is especially true of data networks with error correction or with repeat transmission such as, by way of a non-limiting example, Ethernet over WiMAX.

When the latency is substantially longer than a time slot, using an unused reuse resource block may still be done, but chances of interference due to unwanted simultaneous use of re-use sub-channels go up.

One way in which resource allocation in Time Division Duplexing (TDD) is implemented, according to some embodiments of the present invention, is by dividing resource blocks into several groups of resource blocks. Each group of resource blocks may include one or more resource blocks.

It is again noted that resource allocation in TDD is an example, and other resource allocation schemes suitable for optionally dividing resource blocks into several groups of resource blocks stand to improve resource use by using embodiments of the invention.

By way of a non-limiting example, three groups are described herein. It is noted that two groups, and more than three groups are also contemplated, and the example of three groups is chosen for a descriptive purpose. Expansion to two groups or to more than three groups is considered trivial for persons skilled in the art.

In an exemplary embodiment of the invention, UL and DL zones are divided into three groups of resource blocks. Each BS is assigned one group as a primary resource, one group as a secondary resource, and one group as a tertiary resource.

Figure 7:
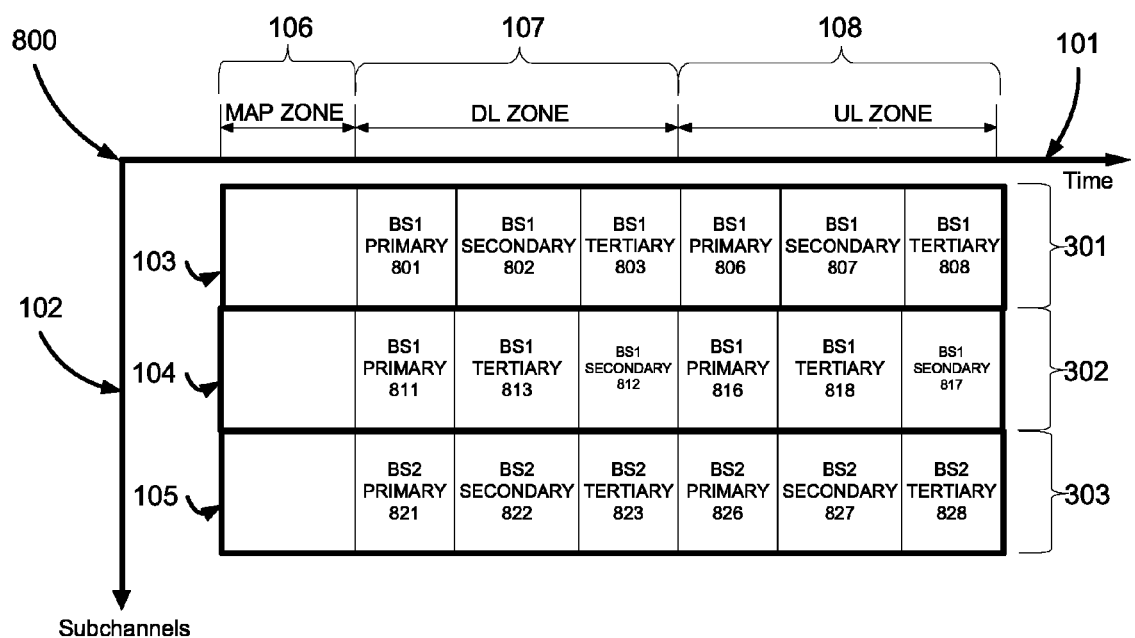
FIG. 7 is a simplified illustration of a grouping of resource blocks in a frame constructed and operating according to an example embodiment of the present invention.

Reference is now made to FIG. 7, which is a simplified illustration of a grouping of resource blocks in a frame 800 constructed and operating according to an example embodiment of the present invention.

The frame 800 includes the horizontal time axis 101 and the vertical frequency axis 102 of FIG. 1. The frequency axis 102 depicts the several reuse sub-channels 103 104 105 of FIG. 1. The time axis 101 depicts the time frame, subdivided into a MAP zone 106, a DL zone 107, and a UL zone 108 as in FIG. 1.

The sub-channels 103 104 105 are divided among BSs, for use in communication with MSs. By way of a non-limiting example, two of the sub-channels are depicted which have been allocated to a first base station BS1, and one of the sub-channels is depicted which has been allocated to a second base station BS2.

The DL zone 107 of the first sub-channel 103 has been divided into a primary group 801 for the BS1, a secondary group 802 for the BS1, and a tertiary group 803 for the BS1. The UL zone 108 of the first sub-channel 103 has been divided into a primary group 806 for the BS1, a secondary group 807 for the BS1, and a tertiary group 808 for the BS1.

The DL zone 107 of the second sub-channel 104 has been divided into a primary group 811 for the BS1, a tertiary group 813 for the BS1, and a secondary group 812 for the BS1. The UL zone 108 of the second sub-channel 103 has been divided into a primary group 816 for the BS1, a tertiary group 818 for the BS1, and a secondary group 817 for the BS1.

The DL zone 107 of the third sub-channel 105 has been divided into a primary group 821 for the BS2, a secondary group 822 for the BS2, and a tertiary group 823 for the BS2. The UL zone 108 of the third sub-channel 103 has been divided into a primary group 826 for the BS2, a secondary group 827 for the BS2, and a tertiary group 828 for the BS2.

Figure 8:
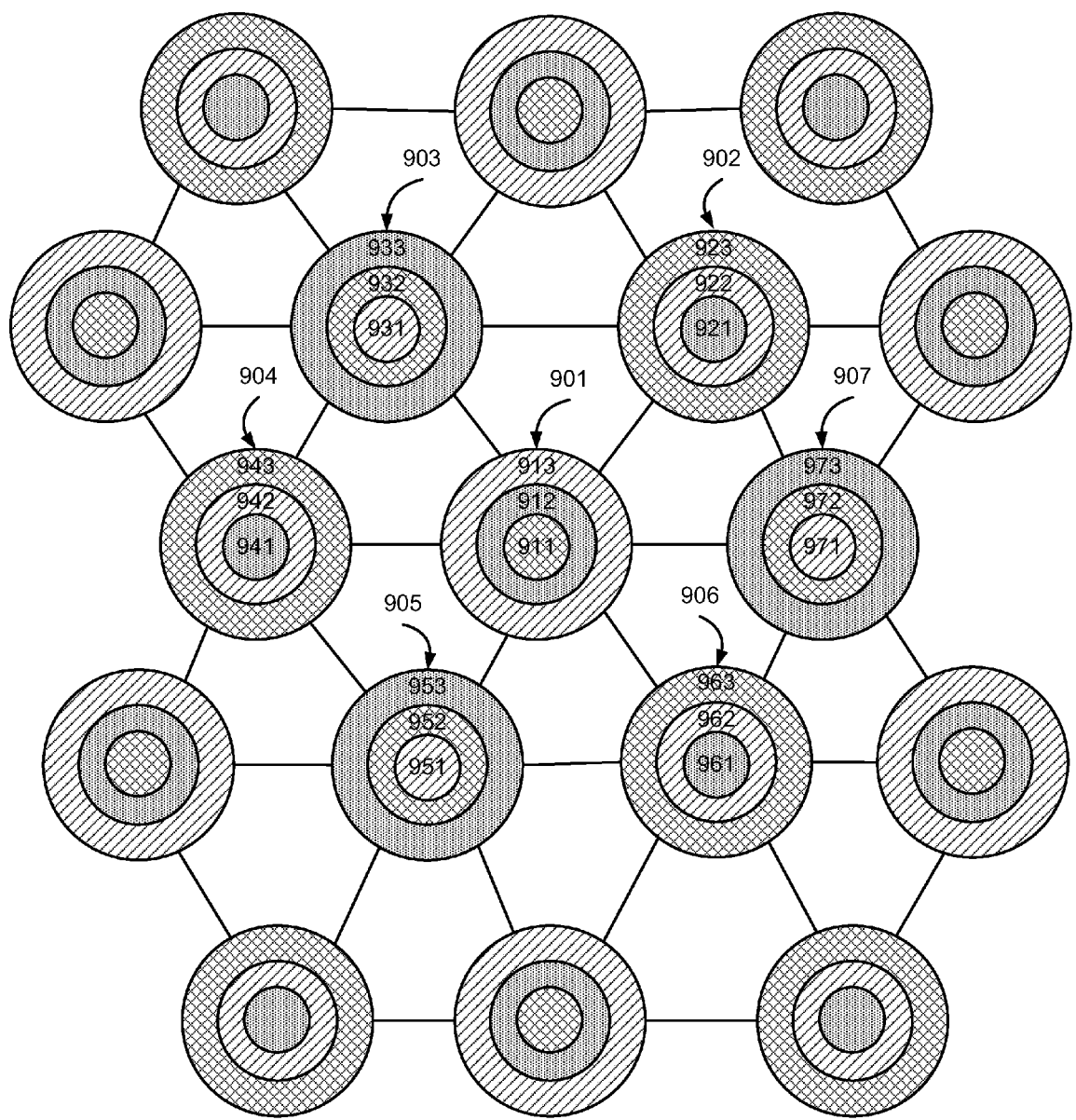
FIG. 8 is a simplified illustration of a network of base stations constructed and operating according to an example embodiment of the present invention, showing groups of reuse sub-channels.

Reference is now made to FIG. 8, which is a simplified illustration of a network of base stations constructed and operating according to an example embodiment of the present invention, showing groups of reuse sub-channels.

The network connects, by way of a non-limiting example, every base station connected by the network to every one of six adjacent neighboring base stations, and to additional non-adjacent neighboring base stations.

A first base station 901 is connected to 6 neighboring base stations 902 903 904 905 906 907.

The first base station 901 has several resource blocks allocated as a primary resource. The primary resource is depicted as a group 911. The first base station 901 also has several resource blocks allocated as a secondary resource. The secondary resource is depicted as a group 912. The first base station 901 also has several resource blocks allocated as a tertiary resource. The tertiary resource is depicted as a group 913.

The neighboring base stations 902 903 904 905 906 907 have primary resources depicted a groups 921 931 941 951 961 971, secondary resources depicted as groups 922 932 942 952 962 972, and tertiary resources depicted as groups 923 933 943 953 963 973.

Other base stations depicted in FIG. 8 are also depicted as having primary, secondary, and tertiary resources. The other base stations and resources are not marked by reference numbers, but their meaning is intended to be consistent with the explanation referring to the base stations and resources which are marked by reference numbers.

Three different patterns are used in FIG. 8, to depict three groups of reuse resource blocks. The groups of reuse resource blocks are selected so that no base stations have the same resource blocks serving as a primary resource as their adjacent neighbors in the network. The groups of resource blocks are also selected so that no base stations have the same resource blocks serving as a secondary resource as their adjacent neighbors in the network, nor share the same resource blocks serving as a tertiary resource as their adjacent neighbors in the network.

Selection of three groups of resource blocks is a matter of selecting sub-channels and time slot combinations among the sub-channels and time slot combinations available to the base stations.

Based on the above resource blocks mapping, optionally no base station should interfere with a neighboring base station when each is using its primary resources. When a need arises to use a resource block from a secondary resource, the base station optionally has data on which of its neighbors has a resource block free for use. The data has optionally been transferred over the network.

An exemplary method for a base station to select which resource blocks to use for communication is now described.

Each base station optionally has data describing primary, secondary, and tertiary resource blocks of relevant neighbors. More relevant neighbors are adjacent neighbors, where interference may occur during communication over the same resource block. Less relevant neighbors are more distant neighbors, which would not cause interference when communicating over the same resource block, but could cause interference with adjacent neighbors is using the same resource block.

(a) Each base station transmits the number of resource blocks it plans to use to its adjacent neighbors.

(b) after receiving the data transmitted in (a), each BS selects which resource blocks to use according to the following rules:

(b.1) each BS may freely use resource blocks from its primary resource;

(b.2) each BS may use that part of its secondary resource which has been left unused by adjacent neighbors which have the BS's secondary resource as their primary resource;

(b.3) each BS may use that part of its tertiary resource which is not planned to be used by adjacent neighbors which have the BS's tertiary resource as their primary resource and/or secondary resource.

It is noted that every BS optionally allocates resources ordered by frequency, so that other BSs may calculate which of their neighbor's resources is free and/or is planned to be free. Other orderings are also contemplated, such as, without limiting generality: increasing order of frequency, decreasing order of frequency, and having a common table of frequency orders. A BS optionally knows a neighboring BS's order of selecting resources.

It is noted that in order to use a tertiary resource, a BS needs to know how much of that resource is free. The BS's tertiary resource is also a secondary resource to some adjacent neighbors, therefore the BS does not immediately know how much of its tertiary resource is free.

(c) after calculating which resource blocks a BS plans to use, the BS transmits its plan to its adjacent neighbors, which can then know which tertiary resources will end up free to be used.

It is noted that the transmission may optionally be by multicasting, posting, and multi-unicasting.

Figure 9:
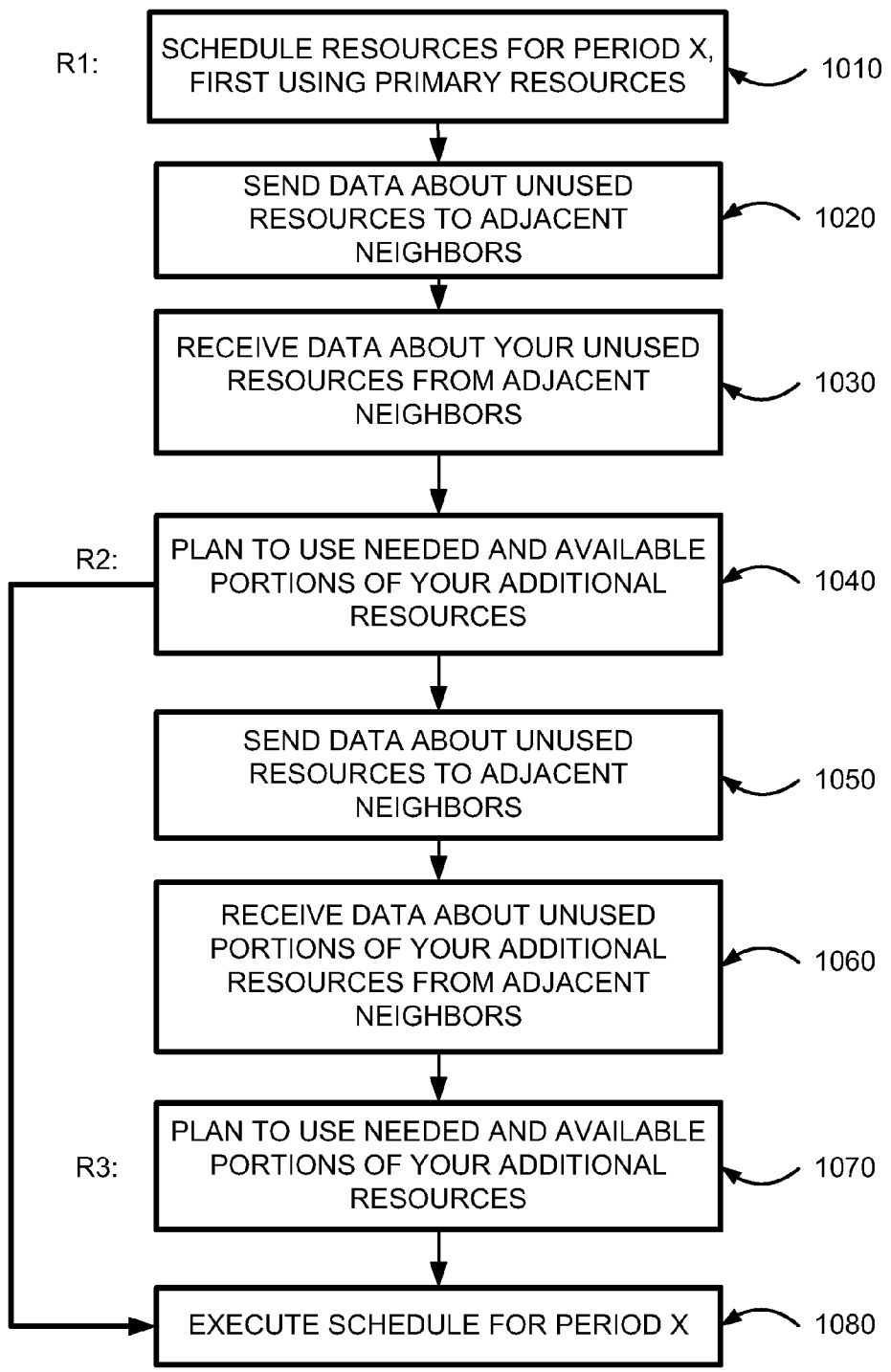
FIG. 9 is a simplified flow chart illustration of a method for planning resource assignment, operating according to an example embodiment of the present invention.

Reference is now made to FIG. 9, which is a simplified flow chart illustration of a method for planning resource assignment, operating according to an example embodiment of the present invention. The flow chart illustrates the method used by a BS to learn about unused resources of neighboring BSs, and to provide information about its own resource use to neighboring BSs.

Each base station schedules use of resources, defined above as resource blocks, to be used in an exemplary time period X, at first optionally using its primary resources (1010).

Following the scheduling of primary resources, each base station optionally sends data about its unused primary resources to its adjacent neighbors (1020). If there are no unused primary resources the base station may optionally send notice of no unused primary resources to its adjacent neighbors.

Each base station then optionally receives the above communication, which provides data about unused resources from its adjacent neighbors (1030). The neighbors' unused resources may be additional resources for the base station to use.

At this point, each base station may, for example, if it needs to use additional resources, plan to use additional, for example secondary, resources which its adjacent neighbors have indicated they are not using (1040). The selection of additional resources is optionally made according to an order as described in item (b.3) above.

At this time, having planned use of whatever primary and additional, for example secondary, resources needed, the base station then executes the schedule for the time period X (1080), that is, communicates using the schedule.

The above described method includes two groups of resources: primary resources and additional, or secondary, resources. Any number of groups of resources may be chosen, and FIG. 9 additionally describes one more group of additional resources, for example tertiary resources. It is noted that more groups of resources may be chosen.

When three groups of resources are included in the method, further actions include having:

The base station sends data about its unused resources to its adjacent neighbors (1050). If there are no unused resources the base station may optionally send notice of no unused resources to its adjacent neighbors.

Each base station receives the above communication, which provides data about unused resources from its adjacent neighbors (1060).

At this point, each base station may, if it needs to use additional resources, plan to use yet additional, for example tertiary, resources which its adjacent neighbors have indicated they are not using (1070).

Having planned use of whatever primary and additional, for example secondary and tertiary, resources needed, the base station then executes the schedule for the time period X (1080), that is, communicates using the schedule.

It is noted that FIG. 9 describes the planning and execution of a schedule for a time period X. Embodiments of the invention do not limit to planning and execution for one time period X at a time. The above description applies, mutatis mutandis, to planning of more than one time period X at a time.

Figure 10:
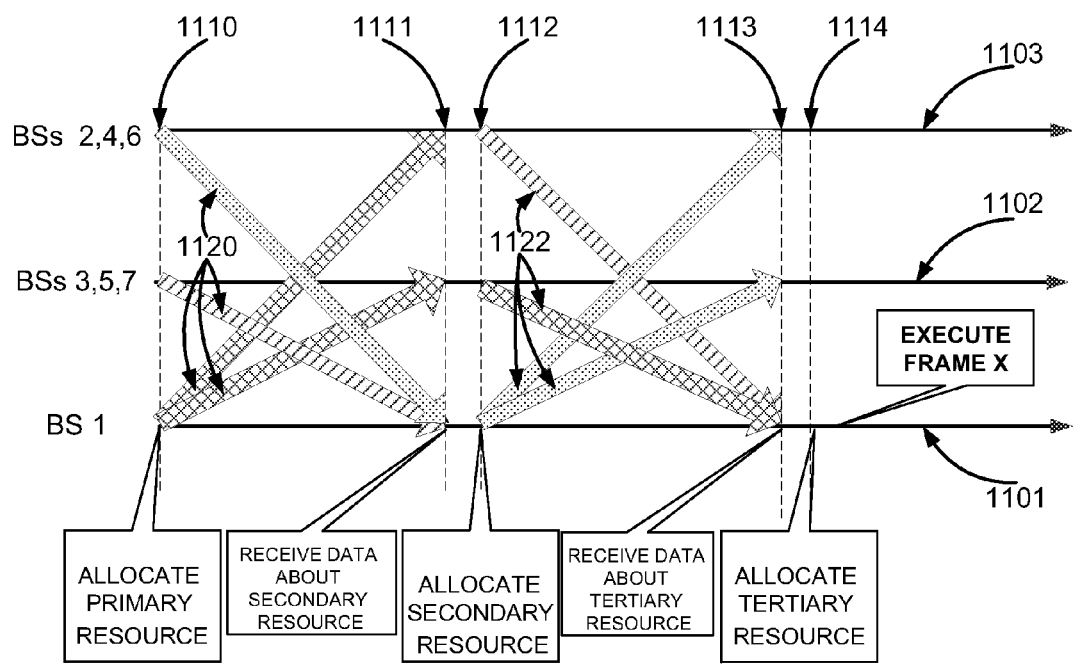
FIG. 10 is a simplified illustration of communications and decisions on a timeline, with reference to base stations constructed and operational according to the example embodiment of FIG. 9.

Reference is now made to FIG. 10, which is a simplified illustration of communications and decisions on a timeline, with reference to base stations constructed and operational according to the example embodiment of FIG. 9.

FIG. 10 depicts the example of FIG. 9 with three groups of resources: primary resources, secondary resources, and tertiary resources. Three parallel timelines 1101 1102 1103 are depicted. A first timeline 1101 describes some of the events happening at a first base station (BS1), which corresponds to the base station 901 of FIG. 8. A second timeline 1102 describes some of the events happening at base stations which are adjacent to the first base station, which correspond to the base station 902 (BS2), the base station 904 (BS4), and the base station 906 (BS6) of FIG. 8. A third timeline 1103 describes some of the events happening at other base stations, which are adjacent to the first base station, and which correspond to the base station 903 (BS3), the base station 905 (BS5), and the base station 907 (BS7) of FIG. 8.

At a time of a first event 1110, BS1 sends data about its unused primary resources to its adjacent neighbors, BSs 3, 5, 7 and BSs 2, 4, 6. The BSs 3, 5, 7 also send data about their unused primary resources to, among others, BS1. The BSs 2, 4, 6 also send data about their unused primary resources to, among others, BS1. The data sent at the time of the first event 1110 is depicted by arrows 1120. The arrows have a fill (dots, diagonals, hatches) intended to correspond to the fills used in FIG. 8 for the resources of the BSs.

At a time of a second event 1111, the BSs, including BS1, receive the data sent at the time of the first event 1110.

At a time of a third event 1112, BS1 allocates its secondary resources, and sends data about its unused secondary resources to its adjacent neighbors, BSs 3,5,7 and BSs 2,4,6. The BSs 3, 5, 7 also send data about their unused secondary resources to, among others, BS1. The BSs 2, 4, 6 also send data about their unused secondary resources to, among others, BS1. The data sent at the time of the third event 1112 is depicted by arrows 1122.

At a time of a fourth event 1113, the BSs, including BS1, receive the data sent at the time of the third event 1112.

At a time of a fifth event 1114, BS1 allocates its tertiary resources. The BSs 3, 5, 7 and the BSs 2, 4, 6 also allocate their tertiary resources.

Following the allocation of primary, secondary, and tertiary resources, the BSs optionally execute their frame allocations.

It is noted that the BSs may, if so desired and/or required, optionally execute frame allocations based on their primary allocations as soon as the time of the first event 1110.

It is noted that the BSs may, if so desired and/or required, optionally execute frame allocations based on their secondary allocations as soon as the time of the third event 1112, and if they have not already done so, the BSs may also optionally execute frame allocations based on their primary allocations as soon as the time of the third event 1112.

It is noted that the examples herein describe three portions of resources which correspond to a hierarchy of three levels.

Figure 11:
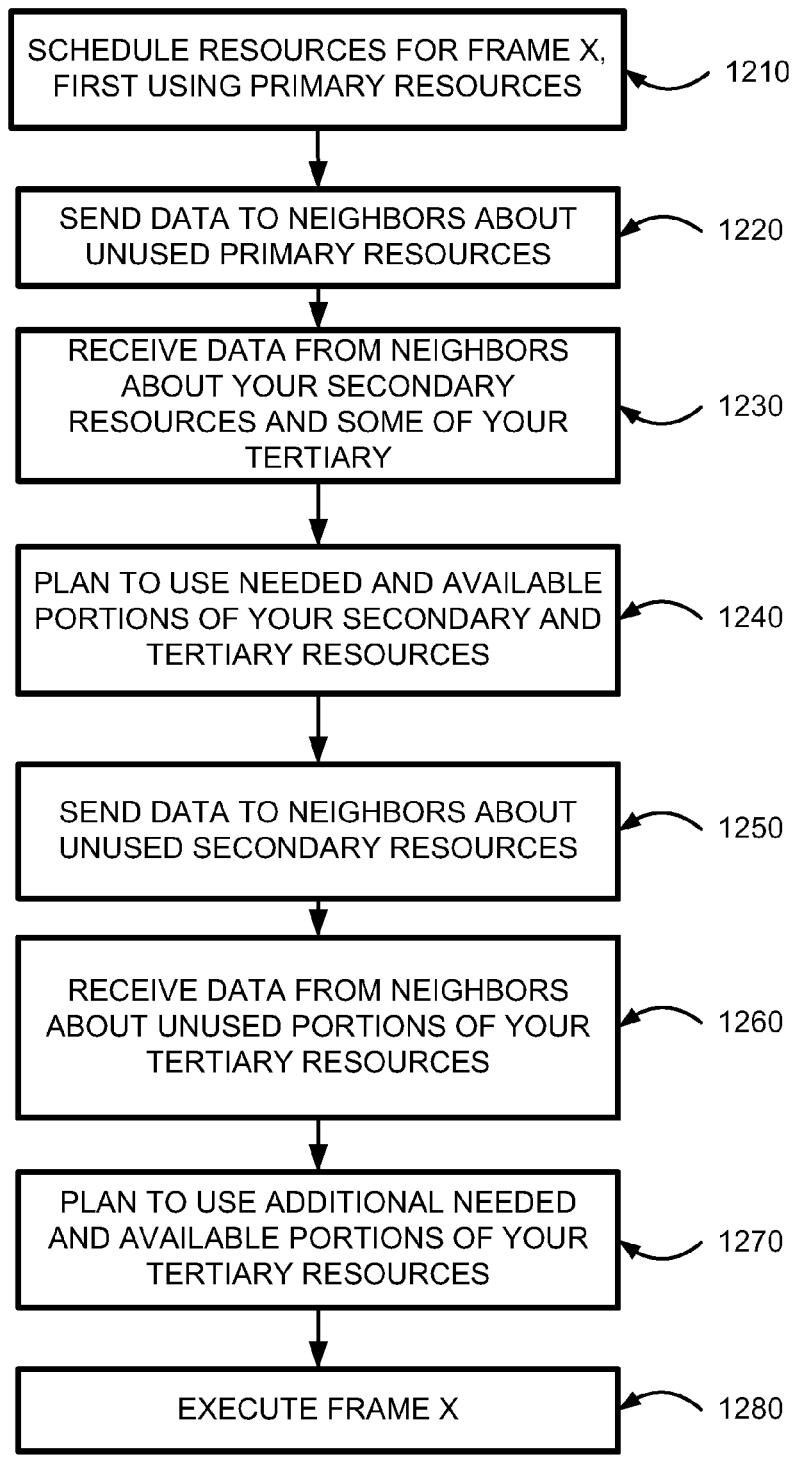
FIG. 11 is a simplified flow chart illustration of a method for planning resource assignment, operating according to an alternative example embodiment of the present invention.

Reference is now made to FIG. 11, which is a simplified flow chart illustration of a method for planning resource assignment, operating according to an alternative example embodiment of the present invention.

An additional method for a base station to select which resource blocks to use for communication is now described. The additional method includes the method described in FIG. 10, and additionally: the transmission of (a) is sent to adjacent neighbors and also to adjacent neighbors of adjacent neighbors. Base stations can therefore calculate (b.1) (b.2) and (b.3) and use some parts of their tertiary resources already after receiving the transmission of (a).

FIG. 10 depicts a method following the example of FIG. 9, with three groups of resources: primary resources, secondary resources, and tertiary resources Each base station schedules use of resources, defined above as resource blocks, to be used in an exemplary frame X, at first using its primary resources (1210).

Following the scheduling of primary resources, each base station sends data about its unused primary resources to its neighbors (1220). The data is sent at least to adjacent neighbors and to neighbors of adjacent neighbors. If there are no unused primary resources the base station may optionally send notice of no unused primary resources to its adjacent neighbors.

Each base station then receives the above communication, which provides data about its secondary resources and its tertiary resources from its neighbors (1230), both adjacent neighbors and at least adjacent neighbors of adjacent neighbors.

At this point, each base station may, if it needs to use additional resources, plan to use secondary resources which its adjacent neighbors have indicated they are not using, and some tertiary resources which are certain of not being used by neighbor base stations (1240).

Now the base station sends data about its unused secondary resources to its neighbors (1250). The data is sent at least to adjacent neighbors and to neighbors of adjacent neighbors. If there are no unused secondary resources the base station may optionally send notice of no unused secondary resources to its neighbors.

Each base station then receives the above communication, which provides data about its tertiary resources from its neighbors (1260), both adjacent neighbors and at least adjacent neighbors of adjacent neighbors.

At this point, each base station may, if it needs to use additional resources, plan to use tertiary resources which its neighbors have indicated they are not using (1270).

Having planned use of whatever primary, secondary, and tertiary resources needed, the base station then executes the exemplary frame X (1280), that is, communicating using frame X.

It is noted that each BS can then transmit its exact MAP allocation to its neighbors, plus a description of the data to be transmitted, as done in a Multicast Broadcast Services (MBS) portion of an OFDMA data frame.

It is noted that the neighbors may apply macro-diversity for specific MSs.

It is expected that during the life of a patent maturing from this application many relevant reuse schemes, resource allocation schemes, OFDM communication schemes such as WiMAX and LTE, and Partially Used Sub-Carrier (PUSC) schemes will be developed and the scope of the terms reuse schemes, resource allocation schemes, and Partially Used Sub-Carrier (PUSC) schemes is intended to include all such new technologies a priori.

The terms "comprising", "including", "having" and their conjugates mean "including but not limited to".

As used herein, the singular form "a", "an" and "the" include plural references unless the context clearly dictates otherwise. For example, the term "a unit" or "at least one unit" may include a plurality of units, including combinations thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of using resource blocks in a communication system with a plurality of Base Stations (BSs), comprising:
    at least two neighboring BSs scheduling use of resource blocks, to be used in a specific time period, each one of the at least two neighboring BSs at first planning to use resource blocks defined as primary resources for each one of the at least two neighboring BSs;
    the at least two BSs communicating a first message comprising information about at least one resource block each one of the at least two BSs is not planning to use, to their adjacent neighbors;
    the at least two BSs receiving the message;
    the at least two BSs scheduling use of the resource blocks referenced in the first message; and
    the at least two BSs executing their schedule.

2. The method of claim 1 and further including, after the at least two BSs scheduling use of the resource blocks referenced in the first message:
    the at least two BSs communicating a second message comprising information about at least one additional resource block each one of the at least two BSs is not planning to use;
    the at least two BSs receiving the second message; and
    the at least two BSs scheduling use of the additional resource blocks, before the at least two BSs execute their schedule.

3. A method of using resource blocks in a communication system with a plurality of Base Stations (BSs), comprising:
    at least three neighboring BSs, of which at least two BSs are not adjacent neighbors of each other, scheduling use of resource blocks, to be used in an communication frame, each one of the three neighboring BSs at first scheduling use of resource blocks defined as primary resources for each one of the three neighboring BSs;
    the at least three BSs sending a first message comprising information about resource blocks not scheduled for use to other BSs of the at least three BSs;
    the at least three BSs receiving the first message;
    the at least three BSs scheduling use of the resource blocks referenced in the first message; and
    the at least three BSs executing their schedule.

4. The method of claim 3, and further including, after the at least three BSs scheduling use of the resource blocks referenced in the first message:
    the at least three BSs sending a second message comprising information about at least one additional resource block each one of the at least three BSs is not planning to use;
    the at least three BSs receiving the second message; and
    the at least three BSs scheduling use of the additional resource blocks, before the at least three BSs execute their schedule.

5. The method of claim 3, and further comprising additional cycles of:
    at least one of the at least three BSs sending a message comprising information about at least one more additional resource block the at least one BS is not planning to use to the others of the at least three BSs;
    the others of the at least three BSs receiving the message; and
    at least one of the at least three BSs scheduling use of the at least one more additional resource block,
    before the at least three BSs execute their schedule.

* * * * *